United States Patent

Sol

[11] 3,910,401
[45] Oct. 7, 1975

[54] DEVICE FOR COUNTING AND GROUPING SUBSTANTIALLY PIN-SHAPED PRODUCTS DURING TRANSPORT

[75] Inventor: Cornelis Sol, Westzaan, Netherlands

[73] Assignee: Van Der Molen Machinefabriek B.V., Zaandam, Netherlands

[22] Filed: Mar. 12, 1974

[21] Appl. No.: 450,387

[30] Foreign Application Priority Data
Mar. 26, 1973   Netherlands................... 7304165

[52] U.S. Cl. ...................... 198/24; 198/34; 198/40
[51] Int. Cl.² .................. B65G 47/22; B65G 47/52
[58] Field of Search ................. 198/24, 40, 34, 106

[56] References Cited
UNITED STATES PATENTS

| | | | |
|---|---|---|---|
| 704,890 | 7/1902 | Morrison | 198/24 |
| 913,285 | 2/1909 | Harbeck | 198/24 |
| 1,604,348 | 10/1926 | Harber | 198/24 X |
| 1,838,936 | 12/1931 | Freese | 198/24 |
| 1,993,586 | 3/1935 | Bech | 198/34 X |
| 2,406,726 | 8/1946 | Weimont | 198/40 |
| 3,165,195 | 1/1965 | Sass et al. | 198/40 |
| 3,204,752 | 9/1965 | Conner | 198/34 |
| 3,311,215 | 3/1967 | Clark et al. | 198/106 |
| 3,712,452 | 1/1973 | Takahashi | 198/34 |

*Primary Examiner*—Evon C. Blunk
*Assistant Examiner*—Jeffrey V. Nase
*Attorney, Agent, or Firm*—Stevens, Davis, Miller & Mosher

[57] ABSTRACT

A device for counting and grouping substantially pin-shaped products during transport comprising a first pusher movable at right angles with respect to the transport track for removing a product to be counted from the transport track, said pusher being coupled to a counting mechanism, a shoving element operating parallel to the transport track adapted to transfer the product lifted from the transport track on to an accessory transport track, a second pusher also operating parallel to the transport track for moving a predetermined number of products over a certain distance along the accessory transport track, synchronically operating driving means for both pushers and the shoving element for whether or not coupling the first pusher to its driver.

The first pusher destined for removing a product to be counted from the transport track substantially consists of a bar, rod or the like formed with a plateau with which a product to be counted can be brought into contact, said bar being capable on the other hand to co-operate with the end of a lever swingable about a fixed point, the swinging movements of which lever are controlled by a curve and wherein the co-operation can selectively be accomplished or interrupted in that the relative end of the bar or the like is brought into or out of the operative stroke of said lever and wherein further the bar is formed with means capable of transmitting the operative stroke to a counting mechanism.

9 Claims, 2 Drawing Figures

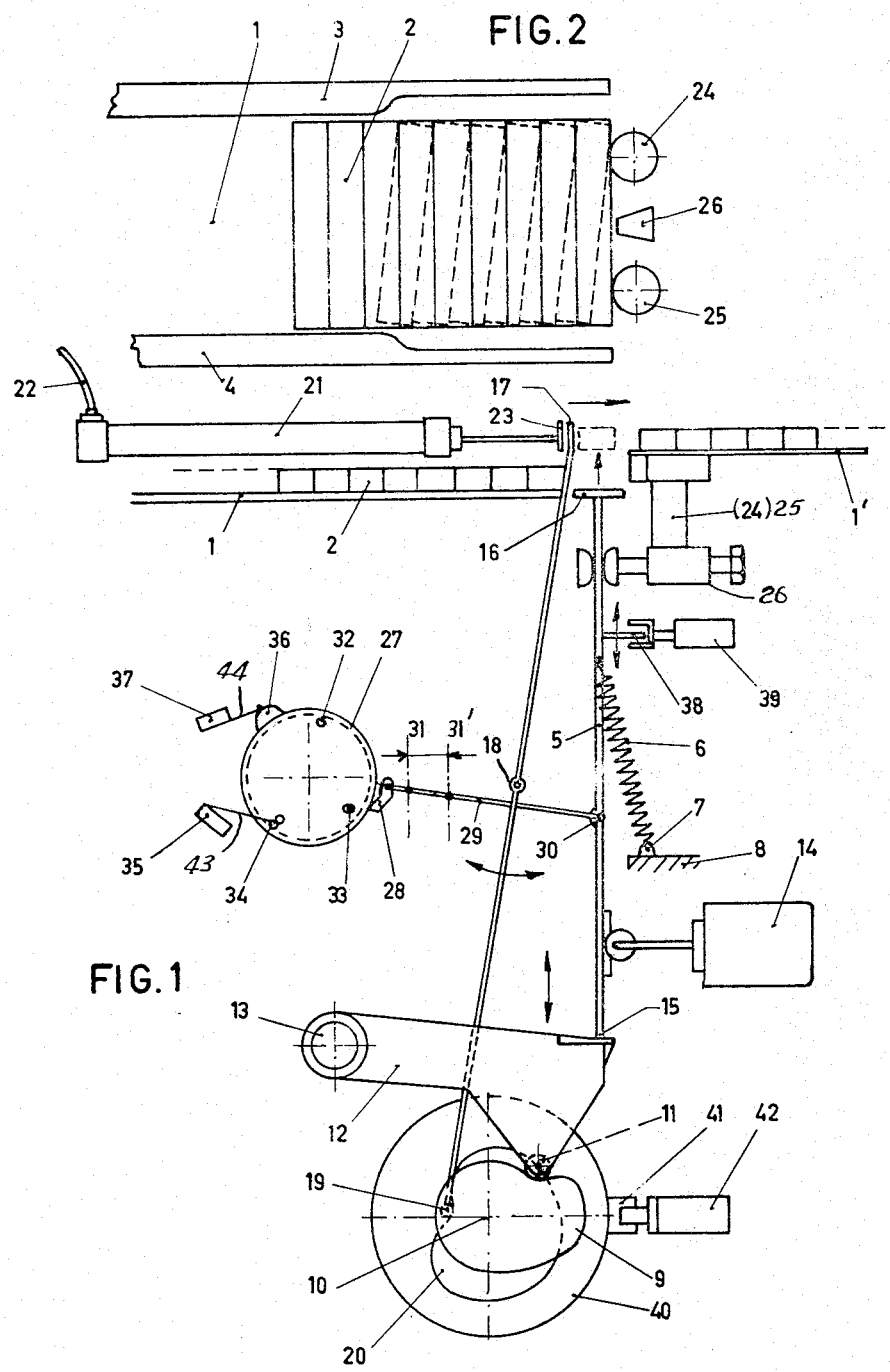

DEVICE FOR COUNTING AND GROUPING SUBSTANTIALLY PIN-SHAPED PRODUCTS DURING TRANSPORT

This invention relates to a device for counting and grouping substantially pin-shaped products during transport. The device of the invention may form part of an installation by means of which said products have to be transferred e.g. into boxes or a similar packing.

To be understood by pin-shaped products such products the length of which is more than once their cross section. Examples thereof are: pencils, oblong biscuits such as sold under the name of "long fingers" as also cigars.

Although not restricted thereto the invention will more particularly be discussed and explained with reference to the case in which cigars are the products in question since the device of the invention has been destined and designed for that kind of products.

The invention has for its object the counting of cigars by simple means and in a quick and accurate manner, subsequently grouping them to form a layer which thereafter can be transferred into a box, case or the like.

The device of the invention mainly comprises a first pusher movable at right angles with respect to the transport track for removing a product to be counted from the transport track, said pusher being coupled to a counting mechanism, a shoving element operating parallel to the transport track adapted to transfer the product lifted from the transport track on to an accessory track, a second pusher also operating parallel to the transport track for moving a predetermined number of products over a certain distance along the accessory transport track, synchronously operating driving means for both pushers and the shoving element for whether or not coupling the first pusher to its drive.

The products to be counted are transferred to the transport track by a feeding device not forming a part of the present invention so that during the operation of the device an uninterrupted feed of products is ensured.

In one embodiment of the invention the first pusher destined for removing a product to be counted from the transport track substantially consists of a bar, rod or the like formed with a plateau with which a product to be counted can be brought into contact, said bar being capable on the other hand to co-operate with the end of a lever swingable about a fixed point, the swinging movements of which lever being controlled by a curve and wherein the co-operation can selectively be accomplished or interrupted in that the relative end of the bar or the like is brought into or out of the operative stroke of said lever and wherein further the bar is formed with means capable of transmitting the operative stroke to a counting mechanism.

For the major part the device can be carried out mechanically or electrically.

The first pusher is e.g. coupled to an adjustable pawl lever by which a mechanical counting wheel can be put into operation, said counting wheel being formed with cams by which switches are operable which attend to the control of the machine.

In another embodiment the first pusher is coupled to an initiator for setting into operation an electrically operating counting mechanism comprising switches or the like capable of putting the first pusher out and the second pusher into operation.

Further particulars of the invention will appear from the following detailed description taken in conjunction with the accompanying drawing. In the latter the device of the invention is reproduced very schematically, viz:

FIG. 1 in side view, whereas in
FIG. 2 a detail in top view is drawn.

In the drawing a conveyor 1 is shown which in the present case is a belt conveyor. By means of conveyor 1 oblong objects, schematically indicated in the drawing by 2, are fed. Although the invention is not strictly confined to it, the case will be dealt with in the following in which the oblong products are cigars. By 3 and 4 (see FIG. 2) guiding elements are reproduced which bound conveyor 1 on both sides.

Substantially at an angle to the direction of movement of conveyor 1 a first pusher 5 is movable in the direction of the arrow drawn. Pusher 5 is pulled into its lowest position by a spring 6 which at 7 is fixed to a machine frame 8.

The movements of first pusher 5 are derived from a cam surface 9 which is turnable on a shaft 10. A roller 11 passes over cam surface 9, said roller being rotatably fixed to a swinging lever 12 which is turnable on a shaft 13. As shaft 10 and thus cam surface 9 rotates swinging lever 12 will move up and down in the direction of the arrow in the drawing. A control-magnet 14 is coupled to pusher 5, said magnet being capable of moving the lower end 15 of pusher 5 outside the operative area of swinging lever 12.

When pusher 5 co-operates with swinging lever 12 in the way indicated in the drawing a product 2 present on a plateau 16 will be moved upwards until in the position shown in broken lines. By 17 a shoving element is indicated by means of which the product can be transferred on to an accessory face 1' which in the case represented is on a slightly higher level than conveyor 1.

Shoving element 17 forms part of a two-armed lever the fulcrum of which is at 18, the free end of which lever rests with a roller 19 on a second cam surface 20. Cam surface 20 is coaxial with curve 9, in other words they are mounted on the same driving shaft 10. As shaft 10 is set into rotation cam surface 20 will follow the movement wherein the two-armed lever starts rotating on point 18 in the way indicated by the arrow and thus shoving element 17 performs the desired movement to and fro. On top of conveyor 1 and substantially parallel to it a pneumatic cylinder 21 is shown, said cylinder being connected to a hose or similar supply lead 22. Inside cylinder 21 a piston is movable which is connected to a plunger the free end 23 of which forms a second pusher 23. For as plateau 16 or shoving element 17, respectively, assembled on accessory face 1' a predetermined number of products a pressurized medium is admitted to cylinder 21 and second pusher 23 will move said number of products 2 as a group along a certain distance.

As already observed the device of the invention has been fundamentally designed and constructed for packing cigars into boxes, cases or suchlike packing material. Once the desired number of cigars for one layer being completed therein, said layer is moved aside into the packing material.

If the products, such as e.g. cigars, are not absolutely cylindrical but are torpedo-shaped, the difficulty of the products fanning out and getting out of alignment is apt to arise. For meeting said difficulty each product present in the trajectory of plateau 16 is directed to two pins or the like, indicated in FIG. 2 at 24 and 25. A feeler 26 or such like element is provided between pins 24 and 25, said feeler only then susceptible of being controlled as the product is in the position facing directing rollers 24 and 25 as shown in full lines. In case the product slants as drawn in FIG. 2 in broken lines, element 26 will not respond.

A counting mechanism can be coupled to first pusher 5. Each time pusher 5 moves up and down it will indicate that a product present on plateau 16 has been moved out of its original trajectory up to a higher level, which datum can be regarded as a counting pulse. Said counting can be done mechanically or electrically.

In FIG. 1 mechanical counting means are shown comprising a pawl wheel 27 in engagement with a pawl 28. Pawl 28 is fixed to one end of pawl lever 29 the other end 30 of which is coupled to pusher 5. By shifting fulcrum 31 of pawl lever 29 as schematically indicated by fulcrum 31' the effective stroke of pawl 28 with respect to pawl wheel 27 can be changed. The pawl wheel 27 comprises a number of stops 32, 33 and 34 (three in the case indicated) which are capable of being introduced into the trajectory of switch lever of switch 35. Furthermore pawl wheel 27 is formed with a cam 36 capable of co-operating with controlling arm 44 of switch 37.

In the case shown switch 35 will be controlled three times during any complete revolution of pawl wheel 27. To switch 35 the control of the fluid supply to the cylinder 21 is coupled so that in the present case second pusher 23 will become operative also three times at each complete revolution of pawl wheel 27 in order to move a counted number of products to the right along the accessory transport track 1'.

The number of products of each group can be changed by transfer of fulcrum 31 of lever 29 and it is obvious for the number of possibilities, to still vary as one has the disposal of a number of pawl wheels 27 with stops 32, 33 and 34 provided at various points.

If e.g. 50 products such as cigars have to be packed into a box in three layers of 17 each, one cigar is once replaced in this case by for example a cardboard cylinder. For such purpose counting wheel 27 is formed with an extra cam or stop 36 capable of operating switch 37. Switch 37 is coupled to the supply for such a cylinder.

Instead of a mechanical counting device 28–37, 43 and 44 also an electric counter can be incorporated in the counting process. For that purpose pusher 5 is formed with a cam or stop 38 which joins in the movement of pusher 5 as indicated by arrows, said stop 38 being operative in the area of initiator 39. Initiator 39 emits pulses which are transmitted to an electric counting mechanism the effective result of which corresponds to that of mechanical counting device 28–37, 43 and 44.

As shown in FIG. 1 curves 9 and 20 may be cut into the front and rear face of a disc 40 which latter is formed with a cam or the like 41.

Cam 41 moves in the operative area of an initiator 42 which serves to control the operation of magnet 14 into operation. At each revolution of the disc 40 the stop 41 will influence initiator 42 for putting control magnet 14 into operation, which latter then moves free end 15 of pusher 5 into the operative area of swinging arm 12. This however is only possible if the product is directed to pins 24 and 25 in the way indicated in FIG. 2. In other words, feeler 26 announces that the product 2 is in the proper position for being counted and transferred.

I claim:

1. A device for counting and grouping substantially pin-shaped products during transport comprising a transport track, a first pusher movable at right angles with respect to said transport track for removing upwardly a product to be counted from said transport track, a counting mechanism coupled to said first pusher, an accessory transport track, a shoving element operating parallel to said transport track adapted to transfer the product lifted from said transport track on to said accessory transport track, a second pusher also operating parallel to said transport track for moving a predetermined number of products over a certain distance along said accessory transport track, synchronically operating driving means for both said pushers and said shoving element for selectively coupling said first pusher to its driver.

2. The device according to claim 1 wherein said first pusher comprises a bar one end of which is formed with a plateau which contacts said product to be counted and said driving means comprises a lever having a cam receiving surface and pivotable at one end thereof and a rotatable disc defining a first camming surface, the other ends of said bar and lever being selectively cooperatable with each other, the pivotable movements of said lever and in turn the oscillating movements of said bar being controlled by said camming surface in contact with said cam receiving surface and including means to selectively interrupt the cooperation between the ends of said bar and lever, said bar defining means to transmit said oscillating movement to said counting mechanism.

3. The device according to claim 2 wherein said driving means includes an initiator coupled to said disc, said camming surface being in the plane of said disc.

4. The device according to claim 2 wherein said disc defines a second camming surface and said shoving element comprises a two-armed swinging lever the end of which not in contact with the product is coupled to said second camming surface.

5. The device according to claim 1 including an adjustable pawl lever coupled at one end thereof to said first pusher and operatively connected at the other end thereof to a mechanical counting wheel, said counting wheel being formed with cams by which switches are operable to control machine functions.

6. The device according to claim 5, including an initiator coupled to said first pusher for setting into operation an electrically operating counting mechanism comprising switches to control machine functions.

7. The device according to claim 1, including an electro-magnet which upon being energized uncouples said first pusher from said driving means.

8. The device according to claim 1 including means provided in the transport track for directing the product to be counted in a predetermined way.

9. The device according to claim 1 including a pneumatically controlled jack having a plunger to which is fixed said second pusher, said jack being positioned substantially parallel to the transport track whereby the operative stroke passes in the direction of transport of the products to be counted.

* * * * *